United States Patent
Peter-Soldani et al.

(10) Patent No.: US 10,005,676 B2
(45) Date of Patent: Jun. 26, 2018

(54) PROCESS FOR PREPARING A POWDER COMPRISING A SOLID SOLUTION OF URANIUM DIOXIDE AND OF A DIOXIDE OF AT LEAST ONE OTHER ACTINIDE AND/OR LANTHANIDE ELEMENT

(71) Applicants: COMMISSARIAT A L'ENERGIE ATOMIQUE ET AUX ENERGIES ALTERNATIVES, Paris (FR); Orano Cycle, Courbevoie (FR)

(72) Inventors: Guillaume Peter-Soldani, Avignon (FR); Stephane Grandjean, Saint Marcel de Careiret (FR); Francis Abraham, Genech (FR)

(73) Assignees: Commissariat à l'énergie atomique et aux éenergies alternatives, Paris (FR); Orano Cycle, Courbevoie (FR)

( * ) Notice: Subject to any disclaimer, the term of this patent is extended or adjusted under 35 U.S.C. 154(b) by 0 days. days.

(21) Appl. No.: 15/031,105

(22) PCT Filed: Oct. 22, 2014

(86) PCT No.: PCT/EP2014/072647
§ 371 (c)(1),
(2) Date: Apr. 21, 2016

(87) PCT Pub. No.: WO2015/059188
PCT Pub. Date: Apr. 30, 2015

(65) Prior Publication Data
US 2016/0272505 A1  Sep. 22, 2016

(30) Foreign Application Priority Data
Oct. 22, 2013 (FR) .................... 13 60294

(51) Int. Cl.
*C01G 43/00* (2006.01)
*C01G 43/025* (2006.01)
*C01G 56/00* (2006.01)
*G21C 3/62* (2006.01)
*G21C 19/46* (2006.01)
*G21C 21/02* (2006.01)

(52) U.S. Cl.
CPC ........... *C01G 43/025* (2013.01); *C01G 43/00* (2013.01); *C01G 56/004* (2013.01); *C01G 56/005* (2013.01); *C01G 56/007* (2013.01); *G21C 3/623* (2013.01); *G21C 19/46* (2013.01); *G21C 21/02* (2013.01); *C01P 2002/50* (2013.01); *Y02E 30/38* (2013.01); *Y02W 30/883* (2015.05)

(58) Field of Classification Search
CPC .. C01G 43/025; C01G 56/005; C01G 56/007; C01F 17/00
USPC .............................. 423/3, 21.1, 261, 263, 250
See application file for complete search history.

(56) References Cited

U.S. PATENT DOCUMENTS

2012/0177556 A1* 7/2012 Graeve ................... C01B 35/04
423/252

FOREIGN PATENT DOCUMENTS

FR  2 870 841 A1  12/2005

OTHER PUBLICATIONS

French Preliminary Search Report dated Jun. 12, 2014 in Patent Application No. 1360294 (with English translation of categories of cited documents).
International Search Report dated Feb. 2, 2015 in PCT/EP2014/072647.
Hrudananda Jena, et al., "Combustion synthesis and thermal expansion measurements of the rare earth-uranium ternary oxides $RE_6UO_{12}$ (RE=La, Nd and Sm)" Journal of Nuclear Materials, vol. 280, XP055122731, 2000, pp. 312-317.
S. Anthonysamy, et al., "Combustion synthesis of urania-thoria solid solutions" Journal of Nuclear Materials, vol. 278, XP055122732, 2000, pp. 346-357.
Chyi-Ching Hwang, et al., "Development of a novel combustion synthesis method for synthesizing of ceramic oxide powders" Materials Science and Engineering B, vol. 111, XP04517041, 2004, pp. 49-56.
V. Chandramouli, et al., "Combustion synthesis of thoria—a feasibility study" Journal of Nuclear Materials, vol. 265, XP055122757, 1999, pp. 255-261.
V.W. Schneider, et al., "Recent operating experience with the AUPuC-coconversion process" Transactions of the American Nuclear Society, vol. 40, Apr. 1982, 1 Page.

* cited by examiner

*Primary Examiner* — Steven J Bos
(74) *Attorney, Agent, or Firm* — Oblon, McClelland, Maier & Neustadt, L.L.P.

(57) ABSTRACT

A method for preparing a powder of a solid solution of dioxide of uranium and of at least one other actinide and/or lanthanide element comprising combusting a solution that comprises uranyl nitrate and at least one nitrate of the other actinide and/or lanthanide element and glycine, with the glycine being used in a predetermined amount so as to form, at the end of the combustion, the solid solution.

6 Claims, 2 Drawing Sheets

PROCESS FOR PREPARING A POWDER COMPRISING A SOLID SOLUTION OF URANIUM DIOXIDE AND OF A DIOXIDE OF AT LEAST ONE OTHER ACTINIDE AND/OR LANTHANIDE ELEMENT

TECHNICAL FIELD

The invention relates to an innovative method for preparing a powder comprising a solid solution of dioxide of uranium and of at least one other actinide and/or lanthanide element from nitrate solutions, said powder being able to be used for manufacturing nuclear fuels, such as MOX fuels (Mixed OXide Fuel).

Because it sets into play nitrate solutions, the method may be included in the more general process of recycling used fuels, involving a step for dissolving the latter with nitric acid so as to form nitrates.

More specifically, the process may be included in the process for recycling plutonium or even minor actinides from used fuels based on uranium.

STATE OF THE PRIOR ART

In countries having selected a closed cycle, plutonium from used fuels based on uranium is recycled at an industrial scale, with view to manufacturing fuels based on a mixed oxide of uranium and plutonium, called MOX and intended for light water reactors (known under the acronym of LWR).

The basic materials for manufacturing nuclear fuels are oxide powders intended to be compacted and then sintered and optionally rectified in order to form nuclear fuel pellets.

Thus, for manufacturing fuels, the powders used have to meet specific characteristics. They should notably have good flow ability, good compressibility characteristics and a capability of densification by sintering. Furthermore, an important criterion of quality in the final properties of the pellets is the homogeneity of the distribution of the different chemical elements (in this case, uranium and plutonium for MOX) within the powder used for the manufacturing of the pellets, so that this homogeneity is again found in the fuel pellets. Indeed, high homogeneity in the distribution of the elements within the pellets is on the one hand quite favourable for the behaviour of the fuel (notably when this is MOX) in a reactor, notably in a perspective of increasing the combustion rates and facilitates on the other hand complete dissolution of the material at the head of the used fuel processing operations or during recycling of the manufacturing wastes with the thought that this recycling is carried out via a humid route.

For mixed fuels based on plutonium oxide, for example, those of the MOX type, the elaboration of the latter by mechanically mixing powders of simple oxides (for MOX, a $UO_2$ powder and a $PuO_2$ powder) requires reinforced protective steps for handling the problems of proliferation notably related to the use of simple plutonium oxide. Furthermore, it proves to be difficult to obtain a homogenous mixture of powders from the point of view of the distribution of the elements on the basis of a mechanical mixing of the simple oxide powders.

In order to circumvent these drawbacks, the question is posed of directly manufacturing a starting material in the form of mixed oxides, for example, $(U,Pu)O_2$, notably by proceeding with mixing of the chemical elements upstream from the manufacturing of said oxides, which is the case when these mixed oxides are prepared by co-conversion methods (also so called methods by precipitation-calcination).

From among the co-conversion methods already applied, mention may be made of the oxalic co-precipitation method, the carbonate co-precipitation method or further the ammonia co-precipitation method.

For the oxalic co-precipitation method, as described in FR 0 451 058, uranium U(VI) and plutonium Pu(IV) are reduced beforehand to U(IV) and Pu(III). To the resulting mixture is added oxalic acid, which generates a homogenous U(IV)/Pu(III) oxalate precipitate from the point of view of the distribution of the chemical elements. The precipitate, after separation, is then calcined under an inert atmosphere, which leads to the formation of a perfectly homogenous mixed oxide, which may appear as a solid solution.

For the carbonate co-precipitation method, as described in Transactions of the American Nuclear Society, 40 (1982), 50-52, it consists in a conversion into a mixed oxide of a mixture of uranyl and plutonium ions present in a nitric acid solution involving co-precipitation of the uranyl and plutonium ions as a precipitate of uranium and plutonium carbonate and a calcination of said precipitate. More explicitly, the initial step consists of heating the nitric solution of uranyl and plutonium(IV), in order to convert the plutonium Pu(IV) into Pu(VI). The nitric acid concentration of this solution is then adjusted to about 1M by dry distillation followed by re-dissolution of the residue in 1M nitric acid. The resulting solution is then brought to a temperature of 60° C. and carbon dioxide and ammonia are introduced in order to generate the precipitation as a carbonate at a pH located in a range from 7 to 9. The precipitate, after separation, is finally calcined under a controlled atmosphere ($N_2$-3% $H_2$), in return for which a mixed oxide is formed as a solid solution.

For the ammonia co-precipitation method, ammonia is added to the initial solution of uranium and plutonium brought beforehand to a temperature of 50° C., in return for which a co-precipitate is formed. After separation and drying, the precipitate is calcined under a reducing atmosphere leading to the formation of a mixed oxide of uranium and plutonium which is relatively homogenous.

Thus, as a summary, the aforementioned co-conversion methods include at least three steps:

- a step for forming a mixed precipitate from a solution comprising uranium salts;
- a step for separating said precipitate from the solution; and
- a calcination step under a controlled atmosphere of the thereby separated precipitate.

From among the co-conversion methods already applied, mention may also be made of thermal co-denitration methods. For these methods, the initial solution of uranyl and plutonium nitrate is evaporated and then thermally denitrated in order to lead to a mixture of oxides ($UO_3$+$PuO_2$ or $U_3O_8$+$PuO_2$) as a powder. This powder then undergoes a new heat treatment, under a reducing atmosphere, in order to form a mixed oxide of uranium and plutonium as dioxides $UO_2$+$PuO_2$.

Thus, these aforementioned thermal co-denitration methods include at least two steps:

- a step for forming a mixture of oxide phases, including a uranium phase not appearing as a dioxide phase;
- an additional high temperature treatment step under a reducing atmosphere, in order to obtain the aforementioned mixed oxide of uranium and plutonium.

Other synthesis routes for manufacturing powders of mixed oxides have been explored, including in particular the synthesis of mixed oxides by solution combustion, also known as self-propagating combustion synthesis.

Generally, the synthesis of mixed oxides by solution combustion involves the use of a mixture of nitrates of metal elements, which are used both as an oxidizer and as a metal source (the metal elements being those intended to enter the constitution of the mixed oxide) and a fuel, the whole mixed in solution. The aforementioned mixture is subject, first of all, to heating at a low temperature (for example, a temperature ranging from 80 to 600° C.) via an outer source (for example, an oven, a heating plate), with view to initiating the combustion reaction and then the combustion reaction between the fuel and the oxygen-containing species from the decomposition of the nitrates (such as $HNO_3$) gives the possibility of rapidly attaining high temperatures (so called flame temperatures which may range from 600 to 1,300° C.), which will allow propagation and maintaining of the combustion reaction, as long as fuel and oxidizer are in presence (whence the self-propagating nature of the combustion reaction).

This technique has already been applied for preparing mixed oxides comprising uranium, notably for the preparation of mixed oxides $(U,Ce)O_2$ or $(U,Th)O_2$.

For $(U,Ce)O_2$, as described in Journal of Nuclear Materials, 345, 2005, 245-253, it is proceeded with the preparation of a solution of U(VI) nitrate and of Ce(III) nitrate according to a molar ratio Ce/(U+Ce)=0.28, to which is added citric acid (forming the fuel) according to a molar ratio (citric acid/nitrates) equal to 1. The thereby obtained mixture is heated with microwaves, and then on a heating hob, in order to complete the combustion. The resulting powder was then calcined at 800° C. in air. It was observed, by x-ray diffraction analysis that at the end of the calcination, a powder consisting of a mixture of phases $(UO_3+U_3O_8+CeO_2+(U,Ce)O_{2+x})$ is obtained. In order to obtain a solid solution $(U,Ce)O_2$, it is necessary to compact the powder and to sinter the whole at 1,600° C. under $Ar/H_2$.

For $(U,Th)O_2$, as described in Journal of Nuclear Materials, 278, 2000, 346-347, a solution of uranium U(VI) and thorium Th(IV) to which citric acid is added, is heated with microwaves or on a heating hob, until the whole solution is converted into a powder, which is then calcined in air at 700° C. for 5 hours, with view to removing the residual carbon (from 0.2% to 0.4%) and is then shaped before sintering at temperatures comprised between 1,200° C. and 1,500° C. for 5 hours under an argon-hydrogen (2% $H_2$) atmosphere. Different ratios (citric acid/nitrates) and (U/U+Th) were tested, which gave the possibility of reaching the following conclusions:

for contents (U/U+Th)≥0.5, a biphasic mixture comprising a mixed uranium and thorium oxide and $U_3O_8$ is obtained at the end of the combustion; and for contents (U/U+Th)≤0.5 and only for these contents, a solid solution of uranium and thorium oxide is obtained at the end of the combustion.

Thus, in known methods for preparing mixed oxides comprising uranium by solution combustion, except the mentioned specific case in a field of limited compositions, it emerges that the formation of a solid solution of uranium oxide and of another actinide element requires two steps: a first step for forming a mixture of phases ($UO_3$ and/or $U_3O_8+AnO_2$) (An being an actinide element) and a second step for forming a solid solution $(U,An)O_2$ or a mixture of oxides $(UO_2+AnO_2)$ by additional heat treatment of the mixture of phases at the end of the combustion as such.

Considering the foregoing, there therefore exists a need not yet met for a method giving the possibility of obtaining, in a single step for treating a solution by combustion, mixed oxides of uranium and of at least one other actinide and/or lanthanide element as solid solutions from a solution comprising uranium and at least one other actinide and/or lanthanide element, and this regardless of the proportion of the uranium with respect to the other element.

DISCUSSION OF THE INVENTION

The inventors have surprisingly discovered that by using a specific fuel in a specific predetermined amount, it is possible to obtain the aforementioned mixed oxides in a single step.

Thus, the invention relates to a method for preparing a powder of a solid solution of dioxide of uranium and of at least one other actinide and/or lanthanide element comprising a step for combustion of a solution comprising uranyl nitrate and at least one nitrate of the other actinide and/or lanthanide element and a nitrogen-containing fuel, said nitrogen-containing fuel being used according to a predetermined amount in order to form at the end of this step, said solid solution, this predetermined amount advantageously being an over-stoichiometric amount of nitrogen-containing fuel relatively to the uranyl nitrate, this predetermined amount being advantageously obtained by applying the following operations:

a) an operation for determining the combustion equation of uranyl nitrate, to which is assigned a factor $\varphi_U$ to the stoichiometric coefficient of the nitrogen-containing fuel;

b) an operation for determining an over-stoichiometric amount of the nitrogen-containing fuel (so called $Q_U$) by multiplying the known amount of uranyl nitrate by the stoichiometric coefficient of the nitrogen-containing fuel and by the factor $\varphi_U$, the latter being set to a value greater than 1 and preferably to a value ranging from 1.5 to 1.7;

c) an operation for determining the combustion equation of the nitrate of the other actinide and/or lanthanide element, to which is assigned a factor $\varphi_{An/Ln}$ to the stoichiometric coefficient of the nitrogen-containing fuel;

d) an operation for determining an amount of the nitrogen-containing fuel (so called $Q_{An/Ln}$), by multiplying the known amount of nitrate of the other element by the stoichiometric coefficient of the nitrogen-containing fuel and by the factor $\varphi_{An/Ln}$, the latter being set to a value below 2;

e) an operation for obtaining the aforementioned predetermined amount by adding at least the amounts of nitrogen-containing fuel determined in operations b) and d) (i.e., $Q_U$ and $Q_{An/Ln}$).

Before going further into this discussion in more detail, we specify the following definitions.

By solid solution is meant a mixture of uranium and of at least one other actinide and/or lanthanide element forming a single phase homogenous solid of the dioxide type.

By dioxide of uranium and of at least one actinide and/or lanthanide element is for example meant, a compound which may be represented by the following general formula (U, An/Ln)$O_{2±x}$, An and Ln respectively representing an actinide element and a lanthanide element, the uranium, the actinide element and/or the lanthanide element may be present in different proportions and x may range from 0 to 0.25.

By predetermined amount, is meant an amount which will have been selected beforehand so as to obtain said solution.

By over-stoichiometric amount of nitrogen-containing fuel with respect to uranyl nitrate, this means that the nitrogen-containing fuel is initially present (i.e. before the starting of the combustion reaction) in excess relatively to the uranyl nitrate.

Thus, the predetermined amount of nitrogen-containing fuel to be added to the aforementioned solution of nitrates advantageously corresponds, as mentioned above at least to the sum $(Q_u+Q_{An/Ln})$, this predetermined amount corresponding to an over-stoichiometric amount of nitrogen-containing fuel with respect to uranyl nitrate (this over-stoichiometric amount being of course greater than that determined in step b) because of the addition of the amount $Q_{An/Ln}$).

As mentioned above, the over-stoichiometric amount of step b) is preferably determined relatively to the combustion equation of uranyl nitrate in the presence of said fuel, the products of the reaction being uranium dioxide, carbon dioxide, water (as steam) and dinitrogen and optionally one or several other recombination gases.

To do this, it is sufficient in the combustion equation of uranyl nitrate to assign a factor $\varphi_U$ greater than 1, preferably ranging from 1.5 to 1.7 to the stoichiometric coefficient of the nitrogen-containing fuel, this factor $\varphi_U$ may be described as a "richness of the mixture" assigned to uranyl nitrate.

For example, by using glycine, the combustion equation of uranyl nitrate may be written according to one of the following ways:

n representing the number of hydration moles of uranyl nitrate.

To this over-stoichiometric amount obtained in step b), is added at least one amount of nitrogen-containing fuel with respect to the nitrate of the other actinide and/or lanthanide element in order to obtain finally the predetermined amount of nitrogen-containing fuel. In order to obtain this amount of nitrogen-containing fuel relatively to the nitrate of the other actinide and/or lanthanide element, it is sufficient, in the combustion equation of the nitrate of the other actinide and/or lanthanide element, to assign to the stoichiometric coefficient of the fuel, a factor $\varphi_{An/Ln}$ below 2.

Without being bound by theory, the use of an excess of nitrogen-containing fuel relatively to uranyl nitrate allows the formation in situ of reducing gases in a sufficient amount, and, this even in the presence of air, for reducing uranium (VI) into uranium(IV), the latter being thus included in the solid solution of dioxide, the uranium no longer being found as $U_3O_8$ as this is the case with combustion methods of the prior art.

The nitrogen-containing fuel used within the scope of the method of the invention may be selected from urea, glycine, ammonium acetate, hexamethylenetetramine (known under the acronym of HMTA), hydrazides and mixtures thereof, and may advantageously be glycine.

The uranyl nitrate is a uranium(VI) nitrate, i.e. a nitrate of formula $UO_2(NO_3)_2 \cdot xH_2O$, x corresponding to the number of hydration water moles of uranyl nitrate, x may range from 0 to 6.

The nitrate of the other actinide and/or lanthanide element may be:
when it is a nitrate of an actinide element:
a plutonium nitrate and more specifically plutonium (IV) nitrate (which is the degree of oxidation of plutonium which is the most stable in a nitric medium);
a nitrate of a minor actinide and more specifically, americium(III) nitrate (which is the degree of oxidation of americium which is the most stable in a nitric medium), curium(III) nitrate (which is the degree of oxidation of curium which is the most stable in a nitric medium) or neptunium(IV), (V) or (VI) nitrate (which are the degrees of oxidation of neptunium which are the most stable in a nitric medium); and/or
thorium(IV) nitrate; and
when it is a nitrate of a lanthanide element, a lanthanide (III) or (IV) nitrate, such as cerium(III) or (IV) nitrate.

It should be noted that the method of the invention is particularly suitable for nitrates of actinides and/or lanthanides at their degrees of oxidation which are the most stable in a nitric medium.

The combustion step of the method of the invention may consist in a gradual heating operation of the solution up to the ignition temperature (i.e., the temperature for starting the combustion reaction), this ignition temperature may range from 50 to 1,000° C.

The combustion step of the method of the invention may advantageously be carried out in the presence of air.

The method of the invention may further comprise, before the combustion step, a step for preparing the solution comprising uranyl nitrate and at least one nitrate of the other actinide and/or lanthanide element and a nitrogen-containing fuel, this step may consist of adding to a first solution only comprising uranyl nitrate and at least one nitrate of the other actinide and/or lanthanide element, the predetermined amount of nitrogen-containing fuel, this amount having been predetermined, for example in the way explained above.

The method of the invention gives the possibility of obtaining solid solution powders of uranium dioxide and of at least one other actinide and/or lanthanide element, these powders may be used for making nuclear fuel pellets.

To do this, the obtained powders have to be subject to sintering in order to obtain said pellets.

Other features will become better apparent upon reading the additional description which follows, which relates to examples of the manufacturing of powders according to the invention.

Of course, the examples which follow are only given as an illustration of the object of the invention and are by no means a limitation of this object.

DETAILED DISCUSSION OF A PARTICULAR EMBODIMENT

EXAMPLE 1

This example illustrates different tests for preparing a solid solution of uranium and thorium dioxide $(U_y Th_{1-y})$ $O_{2\pm x}$ with y ranging from 0.1 to 0.9 and x from 0 to 0.25 from different solutions of uranyl nitrate and of thorium nitrate and of a specific nitrogen-containing fuel: glycine.

The different tested solutions are the following:
- a solution of uranyl nitrate and of thorium nitrate, for which the molar ratio (U/U+Th) is equal to 0.1 (Test a);
- a solution of uranyl nitrate and of thorium nitrate, for which the molar ratio (U/U+Th) is equal to 0.2 (Test b);
- a solution of uranyl nitrate and of thorium nitrate, for which the molar ratio (U/U+Th) is equal to 0.35 (Test c);
- a solution of uranyl nitrate and of thorium nitrate, for which the molar ratio (U/U+Th) is equal to 0.5 (Test d);
- a solution of uranyl nitrate and of thorium nitrate, for which the molar ratio (U/U+Th) is equal to 0.65 (Test e);
- a solution of uranyl nitrate and of thorium nitrate, for which the molar ratio (U/U+Th) is equal to 0.7 (Test f);
- a solution of uranyl nitrate and of thorium nitrate, for which the molar ratio (U/U+Th) is equal to 0.8 (Test g); and
- a solution of uranyl nitrate and of thorium nitrate, for which the molar ratio (U/U+Th) is equal to 0.9 (Test h).

Before conducting these tests, a preliminary test was conducted only with a solution of uranyl nitrate, so as to determine the glycine content for which only uranium dioxide $UO_2$ is formed. This glycine content is determined in a range from 1.5 to 1.7 times the stoichiometric amount (i.e. $\varphi_U$ ranging from 1.5 to 1.7) established from the following combustion equations:

1°) Test a

A uranyl nitrate and of thorium nitrate solution for which the molar ratio (U/U+Th) is equal to 0.1 was used within the scope of this test, the aforementioned molar ratio being able to be obtained by mixing 1 ml of a mother solution comprising 1 mol·L$^{-1}$ of uranium and 9 ml of a mother solution comprising 1 mol·L$^{-1}$ of thorium.

The combustion equations of uranyl nitrate and of thorium nitrate used within the scope of this example are the following:

for uranyl nitrate:

for thorium nitrate:

From the combustion equations mentioned above and by setting the parameter $\varphi_U=1.7$ (which corresponds to an excess of fuel with respect to the uranium) and $\varphi_{Th}=0.54$ for thorium, the glycine amount $Q_{Gly}$ to be added to the aforementioned solution is determined by the following equation:

$$Q_{gly}=Q_u+Q_{Th}$$

with:
- $Q_U=y*[(10/9)*1.7]$ (y corresponding to the molar uranium content, i.e. 0.1 in this test and the coefficient (10/9)*1.7 determined from the combustion equation corresponding to the number of moles of glycine to be added to the solution with respect to the number of moles of uranium; and
- $Q_{Th}=(1-y)[(20/9)*0.54]$, y corresponding to the same definition as the one given above and the coefficient (20/9)*0.54 determined from the combustion equation corresponding to the number of moles of glycine to be added to the solution relatively to the number of moles of thorium,
- $Q_{gly}$ corresponding to the predetermined amount mentioned in the description above.

The predetermined amount $Q_{gly}$ is added to the solution comprising uranyl nitrate and thorium nitrate.

The resulting solution is gradually heated on a heating hob in air, so as to evaporate it (i.e. 1 hour at 80° C.) until a gel is obtained, and to initiate combustion (the ignition temperature being of the order of 200° C.).

Once the combustion reaction is initiated, the heating is stopped, since the combustion reaction is a self-propagating reaction.

Figure 1:
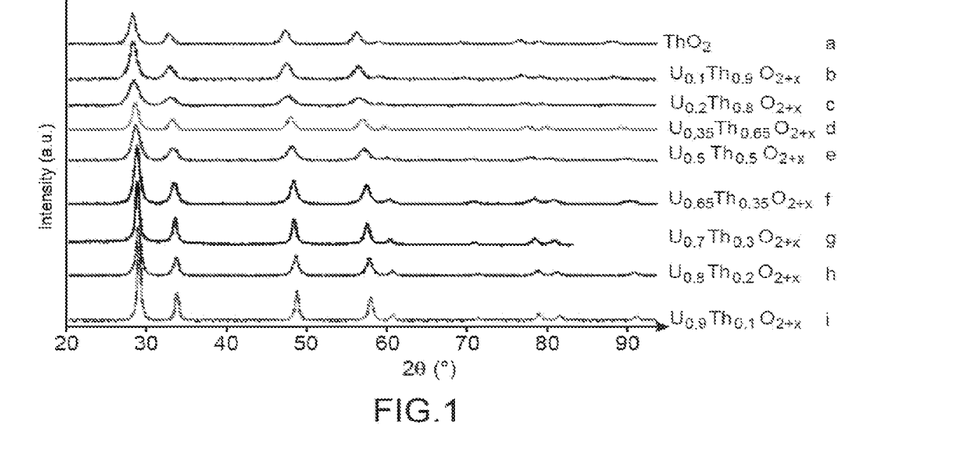
FIG. 1 is an x-ray diffractogram of the powders obtained according to tests a) to h) of Example 1.

The product of the combustion is a powder, which was analyzed by x-ray diffraction, showing that the powder is a solid solution of formula $(U_{0.1}Th_{0.9})O_{2+x}$, x ranging from 0 to 0.25 (see curve b) of FIG. 1).

The diffractogram of $ThO_2$ has characteristic lines of the face-centered cubic structure. These same lines are again found with a shift towards higher angles, characteristics of the insertion of uranium into the structure.

2°) Test b

A solution of uranyl nitrate and of thorium nitrate for which the molar ratio (U/U+Th) is equal to 0.2 is used in this test. This solution is prepared from a mother solution of uranyl nitrate and from a mother solution of thorium nitrate of known concentrations. The required volume of each mother solution is sampled, so as to attain the desired molar ratio (U/U+Th).

The solution is treated under the same conditions as for test a), with a same coefficient $\varphi_U$ relative to uranium and a same coefficient $\varphi_{Th}$ relatively to thorium, the amount of glycine to be added for this test thus being $0.2*[(10/9)*1.7]+0.8*[(20/9)*0.54]$.

The product of the combustion is a powder, which was analyzed by x-ray diffraction, showing that the powder is a solid solution of formula $(U_{0.2}Th_{0.8})O_{2+x}$, x ranging from 0 to 0.25 (see curve c) of FIG. 1).

The residual nitrogen and carbon contents were measured and are the following:
- 0.42±0.04% for carbon;
- 1.93±0.16% for nitrogen.

3°) Test c

A solution of uranyl nitrate and of thorium nitrate for which the ratio (U/U+Th) is equal to 0.35 is used for this test.

This solution is prepared from a mother solution of uranyl nitrate and from a mother solution of thorium nitrate with known concentrations. The required volume for each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.35*[(10/9)*1.7]+0.65*[(20/9)*0.54]$.

The product of the combustion is a powder, which was analyzed by x-ray diffraction, showing that the powder is a solid solution of formula $(U_{0.35}Th_{0.65})O_{2+x}$, x ranging from 0 to 0.25 (see curve d) of FIG. 1).

4°) Test d

A solution of uranyl nitrate and of thorium nitrate for which the ratio (U/U+Th) is equal to 0.5 is used for this test.

This solution is prepared from a mother solution of uranyl nitrate and from a mother solution of thorium nitrate with known concentrations. The required volume for each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.5*[(10/9)*1.7]+0.5*[(20/9)*0.54]$.

The product of the combustion is a powder, which was analyzed by x-ray diffraction, showing that the powder is a solid solution of formula $(U_{0.5}Th_{0.5})O_{2+x}$, x ranging from 0 to 0.25 (see curve e) of FIG. 1).

The residual nitrogen and carbon contents were measured and are the following:
0.34±0.01% for carbon;
1.16±0.11% for nitrogen.

5°) Test e

A solution of uranyl nitrate and of thorium nitrate for which the ratio (U/U+Th) is equal to 0.65 is used for this test.

This solution is prepared from a mother solution of uranyl nitrate and from a mother solution of thorium nitrate with known concentrations. The required volume for each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.65*[(10/9)*1.7]+0.35*[(20/9)*0.54]$.

The product of the combustion is a powder, which was analyzed by x-ray diffraction, showing that the powder is a solid solution of formula $(U_{0.65}Th_{0.35})O_{2+x}$, x ranging from 0 to 0.25 (see curve f) of FIG. 1).

6°) Test f

A solution of uranyl nitrate and of thorium nitrate for which the ratio (U/U+Th) is equal to 0.7 is used for this test.

This solution is prepared from a mother solution of uranyl nitrate and from a mother solution of thorium nitrate with known concentrations. The required volume of each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.7*[(10/9)*1.7]+0.3*[(20/9)*0.54]$.

The product of the combustion is a powder, which was analyzed by x-ray diffraction, showing that the powder is a solid solution of formula $(U_{0.7}Th_{0.3})O_{2+x}$, x ranging from 0 to 0.25 (see curve g) of FIG. 1).)

7°) Test g

A solution of uranyl nitrate and of thorium nitrate for which the ratio (U/U+Th) is equal to 0.8 is used for this test.

This solution is prepared from a mother solution of uranyl nitrate and from a mother solution of thorium nitrate with known concentrations. The required volume of each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.8*[(10/9)*1.7]+0.2*[(20/9)*0.54]$.

The product of the combustion is a powder, which was analyzed by x-ray diffraction, showing that the powder is a solid solution of formula $(U_{0.8}Th_{0.2})O_{2+x}$, x ranging from 0 to 0.25 (see curve h) of FIG. 1).

The residual nitrogen and carbon contents were measured and are the following:
0.50±0.04% for carbon;
0.98±0.06% for nitrogen.

8°) Test h

A solution of uranyl nitrate and of thorium nitrate for which the ratio (U/U+Th) is equal to 0.9 is used for this test.

This solution is prepared from a mother solution of uranyl nitrate and from a mother solution of thorium nitrate with known concentrations. The required volume of each mother solution is sampled, so as to attain the desired molar ratio (U/U+Th).

The solution is treated under the same conditions as for test a), with a same coefficient $\varphi_U$ relatively to the uranium and a same coefficient $\varphi_{Th}$ relatively to the thorium, the glycine amount to be added for this test being $0.9*[(10/9)*1.7]+0.1*[(20/9)*0.54]$.

The product of the combustion is a powder, which was analyzed by x-ray diffraction, showing that the powder is a solid solution of formula $(U_{0.9}Th_{0.1})O_{2+x}$, x ranging from 0 to 0.25 (see curve i) of FIG. 1).

* * *

The result from these tests is that with an excess fuel relatively to the uranium, a solid solution of uranium and thorium dioxide is obtained for uranium contents ranging from 10 to 90%.

EXAMPLE 2

This example illustrates various tests for preparing a solid solution of uranium and cerium dioxide $(U_yCe_{1-y})O_{2\pm x}$, y ranging from 0.2 to 0.8 and x ranging from 0 to 0.25 from various solutions of uranyl nitrate and of cerium nitrate and a specific nitrogen-containing fuel: glycine.

The various tested solutions are the following:
- a solution of uranium (VI) nitrate and of cerium (III) nitrate, for which the molar ratio (U/U+Ce) is equal to 0.2 (Test a);
- a solution of uranium (VI) nitrate and of cerium (III) nitrate, for which the molar ratio (U/U+Ce) is equal to 0.35 (Test b);
- a solution of uranium (VI) nitrate and of cerium (III) nitrate, for which the molar ratio (U/U+Ce) is equal to 0.5 (Test c);
- a solution of uranium (VI) nitrate and of cerium (III) nitrate, for which the molar ratio (U/U+Ce) is equal to 0.65 (Test d);

a solution of uranium (VI) nitrate and of cerium (III) nitrate, for which the molar ratio (U/U+Ce) is equal to 0.7 (Test e); and a solution of uranium (VI) nitrate and of cerium (III) nitrate, for which the molar ratio (U/U+Ce) is equal to 0.8 (Test f).

The combustion equations of uranyl nitrate and of cerium nitrate used within the scope of this example are the following:

for uranyl nitrate:

for cerium nitrate:

From the combustion equations mentioned above and by setting the parameter $\varphi_U$=1.7 (which corresponds to excess fuel relatively to the uranium) and $\varphi_{Ce}$=0.54 for cerium, the glycine amount $Q_{Gly}$ to be added to the aforementioned solution is determined by the following equation:

$$Q_{gly}=Q_u+Q_{Ce}$$

with:

$Q_U$=y*[(10/9)*1.7] (y corresponding to the molar uranium content), and the coefficient (10/9)*1.7 determined from the combustion equation corresponding to the number of moles of glycine to be added to the solution relatively to the number of moles of uranium; and $Q_{Ce}$=(1−y)[(15/9)*0.54], y corresponding to the same definition as the one given above and the coefficient (15/9)*0.54 determined from the combustion equation corresponding to the number of moles of glycine to be added to the solution relatively to the number of moles of cerium, $Q_{gly}$ corresponding to the predetermined amount mentioned in the description above.

1°) Test a

A solution of uranyl nitrate and of cerium nitrate for which the molar ratio (U/U+Ce) is equal to 0.2 is used in this test. This solution is prepared from a mother solution of uranyl nitrate and from a mother solution of cerium nitrate with known concentrations. The required volume of each mother solution is sampled, so as to attain the desired molar ratio (U/U+Ce).

With respect to the introductory paragraph of Example 2, the amount of glycine to be added for this test is 0.2*[(10/9)*1.7]+0.8*[(15/9)*0.54].

The thereby determined amount of glycine is added to the aforementioned solution.

The resulting solution is evaporated on a heating hob in air (1 hour at 80° C.) until a gel is obtained, and then the temperature of the hob is increased until combustion is initiated (the ignition temperature being of the order of 200° C.). The same result is obtained by direct and gradual heating of the solution up to the ignition temperature.

Once the combustion reaction is initiated, heating is stopped, since the combustion reaction is a self-propagating reaction.

Figure 2:
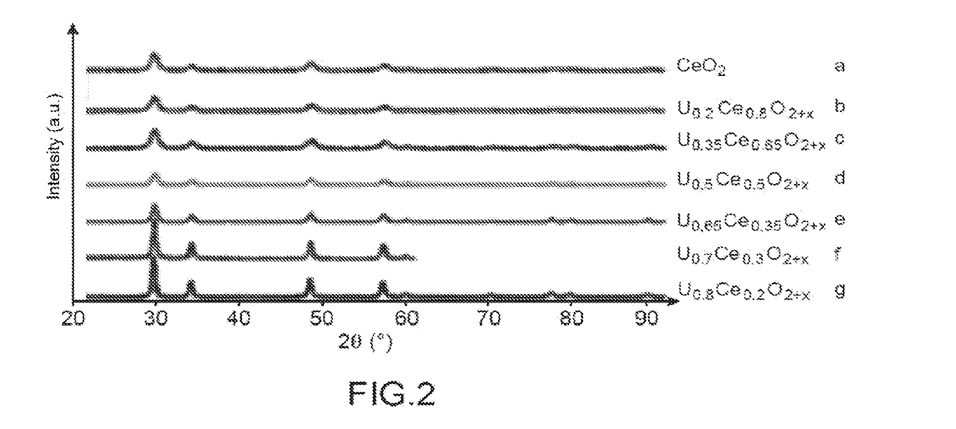
FIG. 2 is an x-ray diffractogram of the powders obtained according to tests a) to f) of Example 2.

The product of the combustion is a powder, which was analyzed by x-ray diffraction, showing that the powder is a solid solution of formula $U_{0.2}Ce_{0.8}O_{2+x}$, x ranging from 0 to 0.25 (see curve b) of FIG. 2).

The diffractogram of $CeO_2$ shows the characteristic lines of the face-centered cubic structure. These same lines are again found, with a shift towards the higher angles, characteristic of the insertion of uranium in the structure.

The residual nitrogen and carbon contents were measured and are the following:

0.37±0.03% for carbon;
1.76±0.14% for nitrogen.

2°) Test b

A solution of uranium (VI) nitrate and of cerium (III) nitrate for which the molar ratio (U/U+Ce) is equal to 0.35 is used in this test.

This solution is prepared from of a mother solution of uranyl nitrate and from a mother solution of cerium nitrate with known concentrations. The required volume of each mother solution is sampled, so as to attain the desired molar ratio (U/U+Ce).

The solution is treated under the same conditions as for test a), with a same coefficient $\varphi_U$ relatively to the uranium and a same coefficient $\varphi_{Ce}$ relatively to the cerium, the amount of glycine added for this test being 0.35*[(10/9)*1.7]+0.65*[(15/9)*0.54].

The product of the combustion is a powder, which was analyzed by x-ray diffraction, showing that the powder is a solid solution of formula $(U_{0.35}Ce_{0.65})O_{2+x}$, x ranging from 0 to 0.25 (see curve c) of FIG. 2).

3°) Test c

A solution of uranium (VI) nitrate and of cerium (III) nitrate for which the molar ratio (U/U+Ce) is equal to 0.5 is used in this test.

This solution is prepared from a mother solution of uranyl nitrate and from a mother solution of cerium nitrate with known concentrations. The required volume of each mother solution is sampled, so as to attain the desired molar ratio (U/U+Ce).

The solution is treated under the same conditions as for test a), with a same coefficient $\varphi_U$ relatively to the uranium and a same coefficient $\varphi_{Ce}$ relatively to the cerium, the added amount of glycine for this test being 0.5*[(10/9)*1.7]+0.5*[(15/9)*0.54].

The product of the combustion is a powder, which was analyzed by x-ray diffraction, showing that the powder is a solid solution of formula $(U_{0.5}Ce_{0.5})O_{2+x}$, x ranging from 0 to 0.25 (see curve d) of FIG. 2).

The residual nitrogen and carbon contents were measured and are the following:

0.25±0.02% for carbon;
0.84±0.01% for nitrogen.

4°) Test d

A solution of uranium (VI) nitrate and cerium (III) nitrate for which the molar ratio (U/U+Ce) is equal to 0.65 is used in this test.

This solution is prepared from a mother solution of uranyl nitrate and from a mother solution of cerium nitrate with known concentrations. The required volume of each mother solution is sampled, so as to attain the desired molar ratio (U/U+Ce).

The solution is treated under the same conditions as for test a), with a same coefficient $\varphi_U$ relatively to the uranium and a same coefficient $\varphi_{Ce}$ relatively to the cerium, the amount of glycine added for this test being $0.65*[(10/9)*1.7]+0.35*[(15/9)*0.54]$.

The product of the combustion is a powder, which was analyzed by x-ray diffraction, showing that the powder is a solid solution of formula $(U_{0.65}Ce_{0.35})O_{2+x}$, x ranging from 0 to 0.25 (see curve e) of FIG. 2).

5°) Test e

A solution of uranium (VI) nitrate and of cerium (III) nitrate for which the molar ratio (U/U+Ce) is equal to 0.7 is used in this test.

This solution is prepared from a mother solution of uranyl nitrate and from a mother solution of cerium nitrate with known concentrations. The required volume of each mother solution is sampled, so as to attain the desired molar ratio (U/U+Ce).

The solution is treated under the same conditions as for test a), with a same coefficient $\varphi_U$ relatively to the uranium and a same coefficient $\varphi_{Ce}$ relatively to the cerium, the amount of glycine added for this test being $0.7*[(10/9)*1.7]+0.3*[(15/9)*0.54]$.

The product of the combustion is a powder, which was analyzed by x-ray diffraction, showing that the powder is a solid solution of formula $(U_{0.7}Ce_{0.3})O_{2+x}$, x ranging from 0 to 0.25 (curve f) of FIG. 2).

6°) Test f

A solution of uranium (VI) nitrate and of cerium (III) nitrate for which the molar ratio (U/U+Ce) is equal to 0.8 is used in this test.

This solution is prepared from a mother solution of uranyl nitrate and from a mother solution of cerium nitrate with known concentrations. The required volume of each mother solution is sampled, so as to attain the desired molar ratio (U/U+Ce).

The solution is treated under the same conditions as for test a), with a same coefficient $\varphi_s$ relatively to the uranium and a same coefficient $\varphi_{Ce}$ relatively to the cerium, the amount of glycine added for this test being $0.8*[(10/9)*1.7]+0.2*[(15/9)*0.54]$.

The product of the combustion is a powder, which was analyzed by x-ray diffraction, showing that the powder is a solid solution of formula $(U_{0.8}Ce_{0.2})O_{2+x}$, x ranging from 0 to 0.25 (see curve g) of FIG. 2).

The residual nitrogen and carbon contents were measured and are the following:
0.37±0.03% for carbon;
1.76±0.14% for nitrogen.

\* \* \*

The result of these tests is that with an excess of fuel relatively to the uranium, a solid solution of uranium and cerium dioxide is obtained for uranium contents ranging from 20 to 80%.

EXAMPLE 3

This example illustrates various tests for preparing a solid solution of uranium and plutonium dioxide $(U_yPu_{1-y})O_{2\pm x}$ (y ranging from 0.25 to 0.75 and x ranging from 0 to 0.25) from different solutions of uranium (VI) nitrate and plutonium (IV) nitrate and of a specific nitrogen-containing fuel: glycine.

The various tested solutions are the following:
a solution of uranium (VI) nitrate and of plutonium (IV) nitrate for which the molar ratio (U/U+Pu) is equal to 0.25 (Test a);

a solution of uranium (VI) nitrate and of plutonium (IV) nitrate for which the molar ratio (U/U+Pu) is equal to 0.5 (Test b); and a solution of uranium (VI) nitrate and of plutonium (IV) nitrate for which the molar ratio (U/U+Pu) is equal to 0.75 (Test c).

The combustion equations of uranyl nitrate and of plutonium nitrate used within the scope of this example are the following:

for uranyl nitrate:

for plutonium nitrate:

From the combustion equations mentioned above and by setting the parameter to $\varphi_U=1.7$ (which corresponds to an excess of fuel relatively to the uranium) and $\varphi_{Pu}=0.1$ for plutonium, the amount of glycine $Q_{Gly}$ to be added to the aforementioned solution is determined by the following equation:

$$Q_{gly}=Q_u+Q_{Pu}$$

with:
$Q_U=y*[(10/9)*1.7]$ (y corresponding to the molar uranium content, and the coefficient $(10/9)*1.7$ determined from the combustion equation corresponding to the number of moles of glycine to be added to the solution relatively to the number of moles of uranium; and $Q_{Pu}=(1-y)[(20/9)*1]$, y corresponding to the same definition as the one given above and the coefficient $(20/9)*1$ determined from the combustion equation corresponding to the number of moles of glycine to be added to the solution relatively to the number of moles of plutonium, $Q_{gly}$ corresponding to the predetermined amount mentioned in the above description.

1°) Test a

A solution of uranyl (VI) nitrate and of plutonium (IV) nitrate for which the molar ratio (U/U+Pu) is equal to 0.25 is used in this test. This solution is prepared from a mother solution of uranyl nitrate and from a mother solution of plutonium nitrate with known concentrations. The required volume of each mother solution is sampled, so as to attain the desired molar ratio (U/U+Pu).

Considering the introductory paragraph of Example 3, the amount of glycine to be added for this test is $0.25*[(10/9)*1.7]+0.75*[(20/9)*1]$.

The thereby determined amount of glycine is added to the aforementioned solution.

The resulting solution is evaporated on a heating hob in air (1 hour at 80° C.) until a gel is obtained, and the temperature of the hob is then increased until the combustion is initiated (the ignition temperature being of the order of 200° C.). The same result is obtained by direct and gradual heating of the solution up to the ignition temperature.

Once the combustion reaction is initiated, the heating is stopped, since the combustion reaction is a self-propagating reaction.

Figure 3:
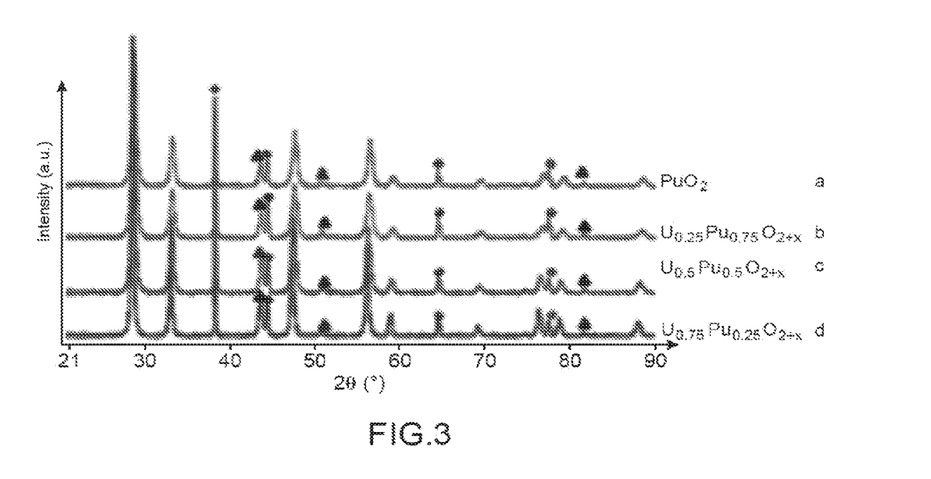
FIG. 3 is an x-ray diffractogram of the powders obtained according to the tests a) and c) of Example 3.

The product of the combustion is a powder, which was analyzed by x-ray diffraction, showing that the powder is a solid solution of formula $U_{0.25}Pu_{0.75}O_{2+x}$, x ranging from 0 to 0.25 (see curve b) of FIG. 3).

The diffractogram of $PuO_2$ shows the characteristic lines of the face-centered cubic structure. These same lines are again found, with a shift towards the higher angles, characteristic of the insertion of uranium into the structure.

2°) Test b

A solution of uranium (VI) nitrate and of plutonium (IV) nitrate for which the molar ratio (U/U+Pu) is equal to 0.5 is used in this test.

This solution is prepared from a mother solution of uranyl nitrate and from a mother solution of plutonium nitrate with known concentrations. The required volume for each mother solution is sampled, so as to attain the desired molar ratio (U/U+Pu).

The solution is treated under the same conditions as for test a), with a same coefficient $\varphi_U$ relatively to the uranium and a same coefficient $\varphi_{Pu}$ relatively to the plutonium, the amount of glycine added for this test being 0.5*[(10/9)*1.7]+0.5*[(20/9)*1].

The product of the combustion is a powder, which was analyzed by x-ray diffraction, showing that the powder is a solid solution of formula $(U_{0.5}Pu_{0.5})O_{2+x}$, x ranging from 0 to 0.25 (see curve c) of FIG. 3).

3°) Test c

A solution of uranium (VI) nitrate and of plutonium (IV) nitrate for which the molar ratio (U/U+Pu) is equal to 0.75 is used in this test.

This solution is prepared from a mother solution of uranyl nitrate and from a mother solution of plutonium nitrate with known concentrations. The required volume of each mother solution is sampled, so as to attain the desired molar ratio (U/U+Pu).

The solution is treated under the same conditions as for test a), with a same coefficient $\varphi_U$ relatively to the uranium and a same coefficient $\varphi_{Pu}$ relatively to the plutonium, the amount of glycine added for this test being 0.75*[(10/9)*1.7]+0.25*[(20/9)*1].

The product of the combustion is a powder, which was analyzed by x-ray diffraction, showing that the powder is a solid solution of formula $(U_{0.75}Pu_{0.25})O_{2+x}$, x ranging from 0 to 0.25 (see curve d) of FIG. 3).

The invention claimed is:

1. A method for preparing a powder of a solid solution of dioxide of uranium and of at least one other actinide and/or lanthanide element comprising:

combusting a solution comprising uranyl nitrate and at least one nitrate of the other actinide and/or lanthanide element and glycine, the glycine being used in a predetermined amount in order to form, at the end of combusting, said solid solution, said predetermined amount being an over-stoichiometric amount of glycine relative to the uranyl nitrate obtained by:

a) determining a combustion equation of uranyl nitrate, to which a factor $\varphi_U$ is assigned to the stoichiometric coefficient of glycine;

b) determining an over-stoichiometric amount of glycine, $Q_U$, by multiplying the amount of uranyl nitrate by the stoichiometric coefficient of glycine and by the factor φU, the latter being set to a value greater than 1;

c) determining a combustion equation of the nitrate of the other actinide and/or lanthanide element, to which a factor $\varphi_{An/Ln}$ is assigned to the stoichiometric coefficient of glycine;

d) determining an amount of the glycine, $Q_{An/Ln}$, by multiplying the amount of the at least one nitrate of the other actinide and/or lanthanide element by the stoichiometric coefficient of the glycine and by the factor $\varphi_{An/Ln}$, the latter being set to a value below 2; and e) obtaining said predetermined amount by adding at least the amounts of glycine determined in b) ($Q_U$) and d) ($Q_{An/Ln}$), respectively.

2. The method for preparing a powder according to claim 1, wherein the factor $\varphi_U$ has a value ranging from 1.5 to 1.7.

3. The method for preparing the powder according to claim 1, wherein the at least one nitrate of the other actinide and/or lanthanide element comprises:

(i) for the nitrate of the other actinide element, a plutonium nitrate, a minor actinide nitrate and/or a thorium (IV) nitrate; and (ii) for the nitrate of the other lanthanide element, a lanthanide (III) or (IV) nitrate.

4. The method for preparing a powder according to claim 1, wherein the combusting comprises gradually heating the solution up to an ignition temperature.

5. The method for preparing a powder according to claim 1, further comprising, before the combusting, preparing the solution comprising uranyl nitrate and at least one nitrate of the other actinide and/or lanthanide element and glycine.

6. The method for preparing a powder according to claim 5, wherein preparing the solution comprising uranyl nitrate and at least one nitrate of the other actinide and/or lanthanide element and glycine consists of adding, to a first solution only comprising uranyl nitrate and at least one nitrate of the other actinide and/or lanthanide element, the predetermined amount of glycine.

* * * * *

UNITED STATES PATENT AND TRADEMARK OFFICE
CERTIFICATE OF CORRECTION

PATENT NO. : 10,005,676 B2  
APPLICATION NO. : 15/031105  
DATED : June 26, 2018  
INVENTOR(S) : Guillaume Peter-Soldani et al.

Page 1 of 1

It is certified that error appears in the above-identified patent and that said Letters Patent is hereby corrected as shown below:

On the Title Page

Item (73), the 1st Assignee's name is incorrect. Item (73) should read:
-- (73) Assignees: Commissariat à l'énergie atomique et aux énergies alternatives, Paris (FR); Orano Cycle, Courbevoie (FR) --

Signed and Sealed this  
Fourth Day of June, 2019

Andrei Iancu  
*Director of the United States Patent and Trademark Office*